Patented Dec. 6, 1932

1,890,393

UNITED STATES PATENT OFFICE

LEON LILIENFELD, OF VIENNA, AUSTRIA

WATER SOLUBLE COMPOUNDS OF CELLULOSE-XANTHO-FATTY ACIDS AND METHOD OF PRODUCING THEM

No Drawing. Application filed January 21, 1926, Serial No. 82,855, and in Austria February 6, 1925.

This invention relates to solvents for making solutions of cellulose-xantho-fatty acids and similar bodies described for example in my U. S. patent referred to below and in British Patent No. 231,800, and relates also to compositions containing such acids or bodies and to new products and to process for bringing such acids and bodies into solution.

One object of my invention is to provide a solvent which will dissolve a relatively large proportion of such acids or bodies, whereby relatively strong or concentrated solutions are obtainable for use in the manufacture of artificial material of the nature referred to in the aforementioned United States patent and British Patent No. 231,800.

Another object of my invention is to produce a solution of such acids or bodies which is stable at room temperature for a considerable period of time. Other objects will appear evident from the description which follows.

The bases hitherto proposed as solvents for cellulose-xantho-fatty acids in the presence of water show, when said bases are employed in excess, the disadvantage that they lead to solutions which sooner or later become gelatinous or mucilaginous. Pyridine alone forms an exception.

I have discovered that phenyl-amine derivatives, arising through the introduction of univalent hydrocarbon radicals into the amido group, especially the monoalkyl derivatives of aniline and its homologues, make in presence of water excellent solvents for cellulose-xantho-fatty acids, and that the solutions of cellulose-xantho-fatty acids in water in the presence of the above described bases, also then show good stability when the bases are employed in excess.

It is immaterial to the process whether and how much the bases themselves are soluble in water. Even water insoluble or slightly soluble bases lead to clear solutions of the cellulose-xantho-fatty acids when they are not employed in excess. Excesses of such bases according to their nature cause turbity of the solutions, which is brought about through emulsion like division in the solutions of the bases, which are for the most part oily.

Even very small quantities of the bases suffice in order to bring the cellulose-xantho-fatty acids into solution. As a rule one molecule of the base suffices for one molecule of cellulose-xantho-fatty acid. According to the nature of the cellulose-xantho-fatty acid solutions of 2%, 5%, 8%, or 10% and above can be produced.

The solutions dry to products which are insoluble in water. The resistance of the bodies to water is increased by heating or steaming.

For practicing the process one can mix the bases with water and in this mixture dissolve the cellulose-xantho-fatty acids; or one can mix or knead the cellulose-xantho-fatty acid with water and then add the base; or one can mix or knead the cellulose-xantho-fatty acid with the base and then add water.

The cellulose-xantho-fatty acid can be used for the present process in a dry or wet state.

Example 1

100 parts by weight of air dried cellulose-xantho-acetic acid prepared according to Examples 1 or 2 of United States Patent No. 1,642,587 or British Patent No. 231,800 are mixed or kneaded with 1900 parts by weight of water and treated with 23 parts by weight of monomethyl aniline. Even after short stirring a clear solution is formed, which can be worked up into artificial materials, coatings or the like in the manner as described in United States Patent No. 1,642,588 or British Patent No. 231,800.

Example 2

100 parts by weight of cellulose-xantho-acetic acid prepared according to example 2 of the United States Patent No. 1,642,587 are immediately, after the precipitation with sulphuric acid and washing, lightly expressed, so that the expressed residue contains 87.08% water. 100 parts by weight of this expressed residue, corresponding with 13 parts by weight of dry cellulose-xantho-acetic acid are dissolved in a mixture of 160 parts by weight of water and 3 parts by weight of monomethyl aniline.

There can be used in the foregoing examples, in place of the methyl aniline, also a mono-alkyl derivative of a toluidine or xylidine.

The phenyl amine alkyl derivatives, such as monomethyl aniline, dimethyl aniline, monoethyl and diethyl aniline, and like derivatives of the homologues of aniline, such as toluidine, xylidine etc., are not only excellent solvents for cellulose-xantho-acetic acid but also for all homologues of the same, that is to say also for cellulose-xantho-propionic acid and the like.

Although water has been described as being used with the aromatic amines for dissolving the cellulose-xantho-fatty acids, it is possible to use a mixture of water with alcohol (ethyl or methyl alcohol), acetone and other organic solvents, either singly with water or in combination. However, the addition of considerable quantities of the organic solvents named cannot be generally used, as precipitation of the cellulose-xantho-fatty acids will occur. Ethyl or methyl alcohol may be used up to approximately 20% in admixture with the water without impairing the solution. Obviously any substance for producing desired technical results in the finished products may be added to the solution and which do not destroy or impair its condition of being a solution suitable for producing said products.

The solutions prepared according to Examples 1 and 2 last at room temperature for months.

The cellulose-xantho-fatty acids, according to the present invention, combine with the aromatic amines herein described, forming salts. Utilizing the reaction between cellulose-xantho-acetic acid and methylaniline as an example, the reaction of forming the salt may be indicated as follows:

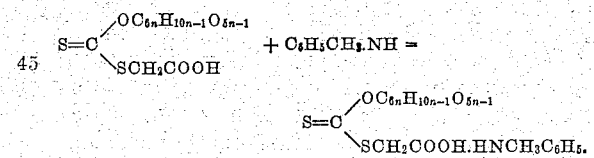

Therefore, utilizing methylaniline in preparing a solution of a cellulose xantho fatty acid, a cellulose-xantho-fatty-acid-amine is formed, namely the cellulose-xantho-fatty acid salt of methylaniline or monomethylaniline cellulose-xantho-acetate.

The expression "cellulose-xantho-fatty acid" occurring in the description and claims includes compounds which are derived from a fatty acid by substituting for a hydrogen atom united to a carbon atom the residue of a cellulose-xanthic acid, in which the cellulose component of the cellulose-xanthic acid may be either cellulose itself or a conversion product of cellulose or a cellulose compound, that is to say, products, for example, which may be obtained by acting on a cellulose-xanthic acid with a mono-halogen derivative of a fatty acid, irrespective of whether the cellulose component of the cellulose-xanthic acid is cellulose, or a conversion product or a compound thereof.

Having thus described my invention what I claim as new and desire to secure by Letters Patent is:—

1. The process of forming a water soluble compound from a cellulose-xantho-fatty acid which comprises treating it in the presence of water with an aromatic amine in which a hydrocarbon radical is connected with the nitrogen of the amine.

2. The process of forming a water soluble compound from xantho-fatty acid which comprises treating it in the presence of water with an aromatic amine in which a methyl radical is connected with the nitrogen of the amine.

3. A new product, a cellulose-xantho-fatty acid salt of an alkyl derivative of an aromatic amine in which an alkyl radical is connected with the nitrogen of the amine.

4. A new product, a cellulose-xantho-fatty acid salt of a monoalkyl derivative of an aromatic amine having the alkyl group connected to the nitrogen of the amine.

5. A new product, a cellulose-xantho-fatty acid salt of a N-methyl aniline.

6. A new product, a water soluble salt of a cellulose-xantho-fatty acid and a N-alkyl amine, the said salt having the property of being stable in water even in the presence of an excess of the amine.

7. A new product, a cellulose-xantho-acetate of an alkyl derivative of an aromatic amine in which an alkyl radical is connected with the nitrogen of the amine.

8. A new product, a cellulose-xantho-acetate of a monoalkyl derivative of an aromatic amine in which the alkyl group is attached to the nitrogen of the amine.

9. A new product, cellulose-xantho-acetate of N-methyl aniline.

10. The process of forming a water soluble compound of a cellulose-xantho-fatty acid which comprises treating a cellulose-xantho-fatty acid in the presence of water with an alkyl derivative of an aromatic amine in which an alkyl radical is connected with the nitrogen of the amine.

11. The process of forming a water soluble compound of a cellulose-xantho-fatty acid which comprises treating a cellulose-xantho-fatty acid in the presence of water with a monoalkyl derivative of an aromatic amine in which the alkyl radical is connected with the nitrogen of the amine.

In testimony whereof I affix my signature.

LEON LILIENFELD.